United States Patent [19]

Sakai

[11] 4,358,190
[45] Nov. 9, 1982

[54] FOCUSSING APPARATUS HAVING BLURRING INDICATOR

[75] Inventor: Yutaka Sakai, Saitama, Japan

[73] Assignee: Fuji Photo Optical Co., Ltd., Omiyo, Japan

[21] Appl. No.: 302,762

[22] Filed: Sep. 16, 1981

[30] Foreign Application Priority Data

Sep. 16, 1980 [JP] Japan ............................. 55-130346[U]

[51] Int. Cl.³ ....................... G03B 13/16; G03B 13/18
[52] U.S. Cl. .................................... 354/198; 354/199; 354/219
[58] Field of Search ................. 354/25 R, 25 P, 25 N, 354/31 F, 166, 53, 163, 195, 198, 199–201, 219, 224, 225, 289; 356/6, 8, 16; 352/140; 250/201

[56] References Cited

U.S. PATENT DOCUMENTS 3,500,736  3/1970  Ewald ............................ 354/199 X
4,041,505  8/1977  Hartmann ........................ 354/25 N Primary Examiner—William B. Perkey
Attorney, Agent, or Firm—Young & Thompson

[57] ABSTRACT

A focussing apparatus for a camera, having an indicator for indicating the degree of blurring of an image produced by the taking lens, comprising a plano-concave lens and a plano-convex lens, of the same curvature, which accordingly have no refracting power when in contact with each other, disposed in the viewfinder's optical path. Signals from an object distance measuring means and a position detecting means for detecting the shifted position of the taking lens, are fed to a differential amplifier. The output of the differential amplifier, which corresponds to the degree of blurring of an image produced by the taking lens, causes the concave lens and/or the convex lens to shift so that the distance between these lenses is directly proportional to the degree of blurring and gives a visible indication of the same in the viewfinder.

5 Claims, 3 Drawing Figures

FOCUSSING APPARATUS HAVING BLURRING INDICATOR

BACKGROUND OF THE INVENTION

The present invention relates to a focussing apparatus for cameras, in which the degree of sharpness or blurring of an object image produced by the taking lens can be directly observed through the viewfinder during the focussing operation.

Most 35 mm compact cameras in use today are adapted to focus automatically on the object to be photographed in such a way that the taking lens is automatically shifted by a distance corresponding to the object distance detected or measured by an automatic built-in focussing device. There are various types of object distance measuring techniques employed in automatic focussing devices. One of these is a trigonometrical ranging technique, whilst another is an ultrasonic echo-ranging technique.

In an automatic focussing device based on the trigonometrical ranging technique, there are first and second auxiliary optical means, namely a stationary mirror and a movable mirror, for producing a pair of auxiliary or detection images on a pair of multi-element detector means. The latter means are so arranged that the distribution of the light patterns of the two images are sensed and compared. An identity of the light distributions relative to the corresponding detector means coincides with an optimum focus of the principal image produced by a taking lens. Such a device is widely known as a *VISITRONIC AUTO FOCUS DEVICE* (trademark of Honeywell Inc., Minneapolis, Minn., U.S.A.)

A camera with the type of built-in autofocus device described above is usually adapted to indicate a focus position of the taking lens in a viewfinder by means of a plurality of focussing zone marks and a pointer operatively connected with the taking lens, each of which marks is provided in an inverted Galilean finder. There is however the disadvantage that the indication thus obtained does not include any information other than the focus position of the taking lens. To avoid this disadvantage, there is provided a device which can show a sharp image in a viewfinder only when the taking lens has been made to focus an image on a film. This device includes an auxiliary lens which serves to indicate a distance measuring area in a viewing field and is caused to be removed from the optical path of the inverted Galilean finder only upon the completion of focussing operation.

According to the device aforementioned, the image within the distance measuring area on the viewing field is out of focus during the focussing operation because of the auxiliary lens in the optical path of finder. On the other hand, the image becomes sharp simultaneously with the completion of the focussing operation because of the removal of the auxiliary lens from the optical path.

The known device is, therefore, useful only in that it can indicate whether or not the taking lens has been made to focus an image on a film. In other words, it cannot indicate whether the image is out of focus. Therefore, in a camera adapted to focus by manually shifting the taking lens while watching an auxiliary image through the viewfinder, there is the disadvantage in operation that the photographer cannot exactly determine the shifting distance of the taking lens for focussing. Furthermore, if the taking lens is automatically shifted by a driving motor for focussing, the photographer cannot determine the sharpness of the image to be photographed prior to the exposure.

OBJECTS OF THE INVENTION

It is therefore a principal object of the present invention to provide a focussing apparatus for a camera, having an indicator for indicating in the viewfinder the degree of blurring of an image to be produced by the taking lens.

It is another object of the present invention to provide such a focussing apparatus which is simple in structure and low in cost.

SUMMARY OF THE INVENTION

In accomplishing these and other objects, there has been provided, in accordance with the present invention, an improved focussing apparatus for a camera, wherein a pair of concave and convex lenses, which have, as when placed in contact with each other, no refractive power, and which are shiftably disposed in the optical path of an inverted Galilean finder. At least one of these lenses is adapted to move away from or toward the other by a distance corresponding to the difference between output signals from a position detecting means for detecting the taking lens position and an object distance measuring means. At the time when an optimum focus of the principal image produced by the taking lens is achieved, the concave lens, for example, is in contact with the convex lens and then a clear image produced by the finder optical system appears. On the contrary, when the taking lens has not focussed on an object, the concave lens is spaced away from the convex lens with accompanying blurring of the image in the viewfinder field. Consequently, the degree of blurring of the principal image produced by the taking lens may be easily known, because it is directly proportional to the degree of blurring of the image in the viewfinder field.

BRIEF DESCRIPTION OF THE DRAWINGS

A better understanding of the present invention may be had from the following detailed description of preferred embodiments of the invention when read in connection with the accompanying drawings, wherein:

As seen in FIG. 1, a conventional distance measuring device 1 built into a camera measures the distance from the camera to the object to be photographed and then generates an electric signal whose voltage which corresponds to the distance measured and hence determines the focal point of a taking lens 2 to be adjusted. In the case of the Visitronic Autofocus Device described above, for example, in the object distance measuring device, a signal may be generated by a potentiometer coacting with a scanning mirror. An objective lens 2 is adapted to focus the image of the object to be photographed on a predetermined plane or a film by the movement of the lens in the direction shown by the left arrow in FIG. 1. The adjusted position of the taking lens 2 is detected by means of a potentiometer 4. Output signals from the distance measuring means 1 and potentiometer 4 respectively are fed to and compared by a conventional differential amplifier 5, which emits a signal corresponding to the difference between the focus position and the actual position of the objective lens.

Figure 1:
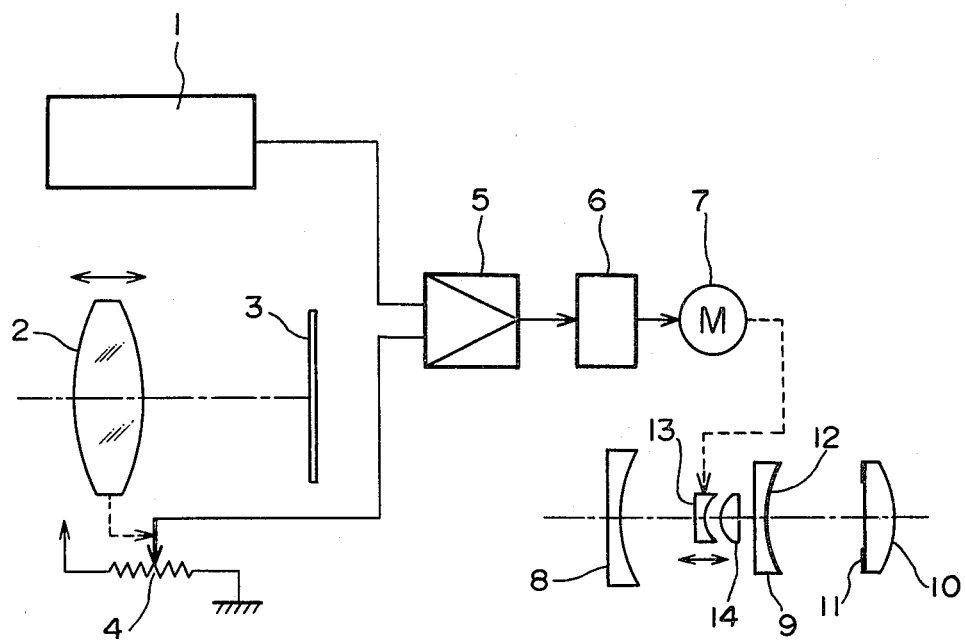
FIG. 1 shows in schematic form a camera with which the invention is used.

The signal from the differential amplifier 5 is, after conversion into an absolute value by a conventional absolute value circuit 6, supplied to a driving means 7 such as a servo-meter, servo-motor or the like. The driving means 7 is caused to rotate an amount corresponding to said positional difference.

As is well known in the art, an Albada finder comprises a negative objective lens 8, a negative intermediate lens 9 and a positive eyepiece 10. Provided on the eyepiece 10 is a finder frame 11, the image of which is reflected by a half-mirror 12 formed on the concave surface of the intermediate lens 9.

In the Albada finder used with the preferred embodiment of the present invention, disposed between the objective lens 8 and intermediate lens 9 is a pair of auxiliary lenses comprising a plano-concave lens 13 and a plano-convex lens 14 which are of the same curvature and which therefore have, when placed in contact with each other, no refracting power.

Figure 2:
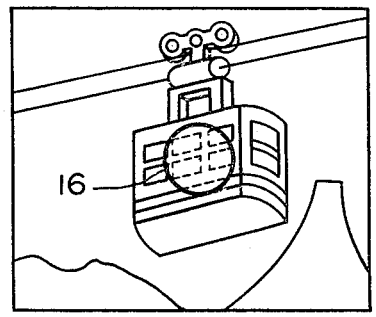
FIG. 2 is a diagram showing the image in the finder field of the camera with which the invention is used.

As shown in FIG. 2, the auxiliary concave lens 13 and convex lens 14 are dimensioned and located in such a way that a distance measuring area of the distance measuring device 1 coincides with an image area designated by numeral 16 on the finder field defined by the auxiliary lenses. As described above, the concave lens 13 is caused to shift along the optical path by the driving means 7. When the taking lens 2 is so positioned as to focus the image of the object to be photographed on a film 3, the concave lens 13 will be in contact with the convex lens 14 because of the arrest of the driving means 7 in its starting position. On the other hand, the taking lens is shifted from its focus position, the concave lens 13 is separated from the convex lens 14 since the driving means 7 operates by an amount corresponding to the distance by which the taking lens 2 is shifted.

The composite focal length of the optical assembly comprising the concave lens 13 and convex lens 14 is given by the following equation:

$$(1/f) = (1/f_A) + (1/f_B) - (d/f_A \cdot f_B) \quad (1)$$

where
$f_A$ = the focal length of the concave lens 13
$f_B$ = the focal length of the convex lens 14
d = the distance between two lenses.

In the optical assembly of this embodiment, the focal length $f_A$ is, in absolute value, equal to the focal length $f_B$, that is: $f_A = f_B$. Then equation (1) is reduced as follows:

$$(1/f) = d/(f_A)^2 \quad (2)$$

As is apparent from equation (2), the composite focal length f varies as the distance d and is proportional to the distance of movement of the concave lens 13. Since the distance d corresponds to the distance shifted from the focus position of the taking lens, the image within the image area 16 produced by auxiliary lenses 13, 14 is blurred to the same degree as is the image produced by the taking lens.

When the taking lens is made to focus an image of an object on the film, the concave lens 13 is in contact with the convex lens 14 and hence distance d becomes zero. Therefore equation (2) is reduced as follows:

$$(1/f) = 0$$

It is apparent that the image within the image area 16 in the viewfinder then becomes sharp.

Consequently the taking lens 2 is shifted in a direction such that the image in the image area 16 in the viewfinder is gradually sharpened with movement of the taking lens; and upon the appearance of a sharp image in the image area 16, the focussing operation of the taking lens is completed.

Figure 3:
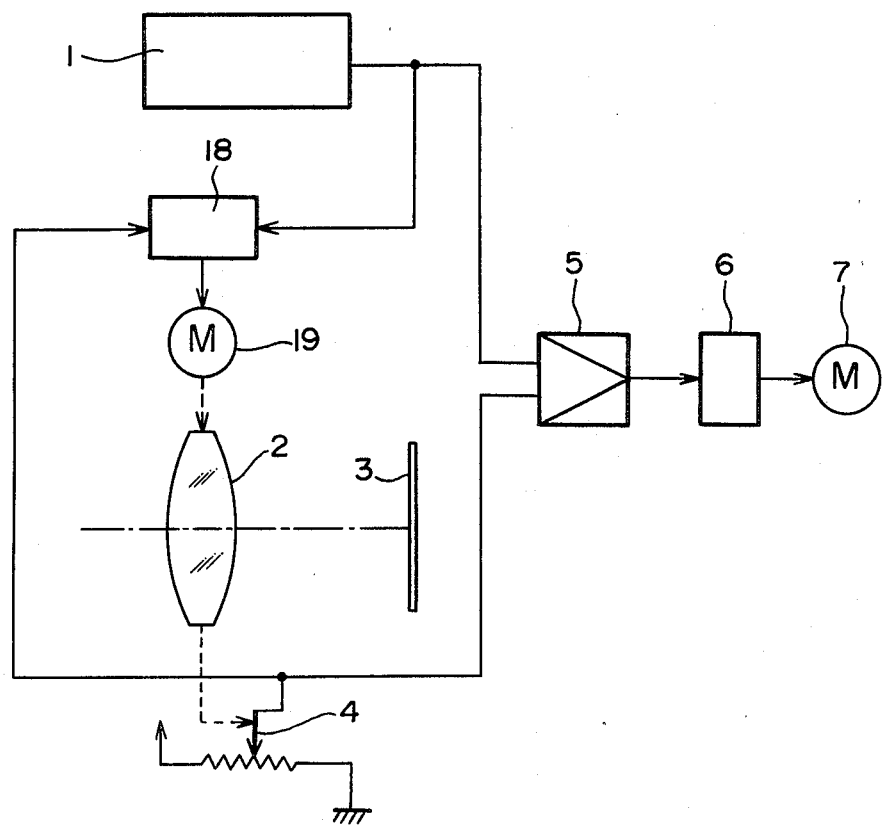
FIG. 3 shows in schematic form another camera with which the invention is used.

Referring now to FIG. 3, there is shown another preferred embodiment of the present invention, which is provided with an automatic focussing device. In this embodiment, input signals to a conventional control circuit 18 from a distance measuring device 1 and a potentiometer 4 are used to drive a servo-motor 19. The movement of the servo-motor 19 causes the taking lens 2 to shift so as automatically to focus an image of the object to be photographed on a film 3. During the automatic focussing operation, a photographer can perceive the degree of sharpness of blurring of the principal image by observing the image within the image area of the viewfinder.

Although a type of Albada finder is used in the embodiments described hereinbefore, it should be understood that any conventional bright-frame finder can instead be used. Furthermore, the convex lens 14 can be shifted independently or cooperatively with the concave lens 13 instead of shifting the latter independently.

As this invention may be embodied in various forms without departing from the essential characteristics thereof, the present embodiments are therefore illustrative only and not restrictive, since the scope of the invention is defined by the appended claims rather than by the description preceding them, and all changes that fall within meets and bounds of the claims, or the equivalents thereof, are therefore intended to be embraced by the claims.

What is claimed is:

1. A focussing apparatus for a camera having a taking lens and a viewfinder, for focussing an image in a predetermined plane and indicating the degree of sharpness of the image produced by said taking lens, said focussing apparatus comprising position detecting means for detecting the position of said taking lens and for generating an electric signal corresponding to the position detected, distance measuring means for measuring the distance to an object to be photographed and for generating an electric signal corresponding to the object distance measured thereby, signal processing means for generating an output signal corresponding to the difference between said electric signals from said detecting means and distance measuring means, a pair of lenses comprising a concave lens and a convex lens disposed in the optical path of said viewfinder and having when in contact with each other no refracting power, and driving means for causing said concave and/or convex lenses to shift relative to each other in such a way said concave and convex lenses are automatically separated from each other the image produced by said taking lens is blurred, whereby the image visible through said pair of lenses is correspondingly blurred.

2. A focussing apparatus as defined in claim 1, wherein an image area in which an image is produced by said concave and convex lenses is coincident with or smaller in size than the distance measuring area of said distance measuring means.

3. A focussing apparatus as defined in claim 1, wherein said position detecting means is a potentiometer coacting with said taking lens.

4. A focussing apparatus as defined in claim 1, and means automatically to shift said taking lens to a position in which said signals from said position detecting means and distance measuring means are identical.

5. A focussing apparatus as defined in claim 1, in which said concave lens is plano-concave and said convex lens is plano-convex and said concave and convex lenses both have the same curvature.

* * * * *